United States Patent Office 2,935,686
Patented May 3, 1960

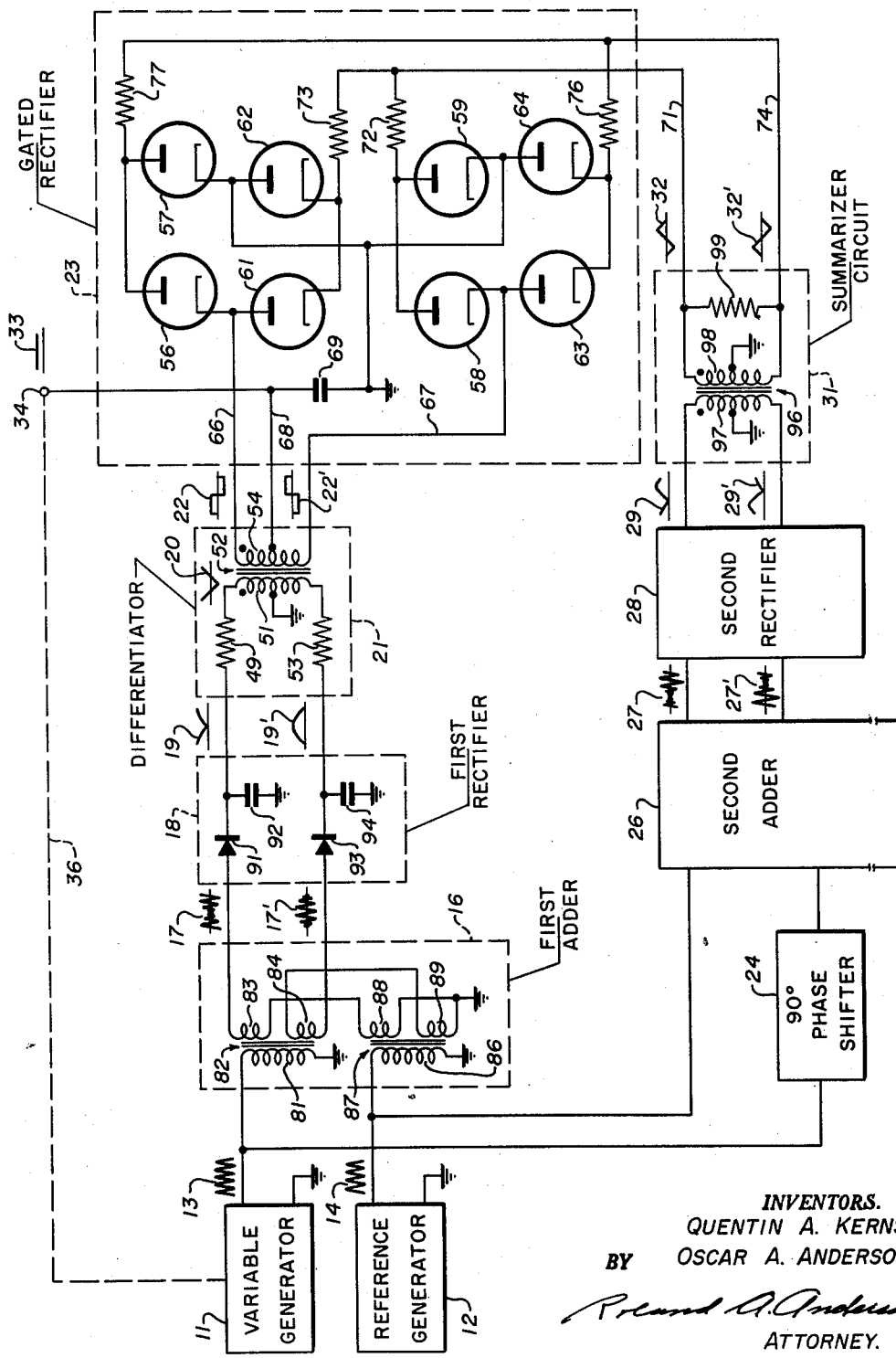

2,935,686

FREQUENCY STABILIZING SYSTEM

Quentin A. Kerns, Orinda, and Oscar A. Anderson, Oakland, Calif., assignors to the United States of America as represented by the United States Atomic Energy Commission Application July 24, 1957, Serial No. 673,989

5 Claims. (Cl. 328—133)

The present invention relates to a frequency synchronizing system and, more particularly, to an electronic circuit responsive to the frequency difference between two concurrent frequencies.

The present invention is useful for comparing two frequencies, producing an output synchronizing signal for frequency correction and/or an indication of the magnitude and sign of frequency difference. The invention is readily adaptable for synchronizing shaft rotation speeds in electrical machinery, either with a reference standard or with another machine. Through the usage of higher frequency type components, the invention may also be utilized for frequency synchronization of radio frequency generators.

The invention utilizes two signal channels, the first channel providing information indicative of the extent of the difference between the two input frequencies while the second channel provides information indicating which of the two input frequencies is higher. The system produces an output signal having a magnitude proportional to the difference between the two frequencies while the polarity of the signal indicates whether the compared frequency is higher or lower than the reference frequency. By having a minimum of capacity in the circuit, the response time is made quite low.

The system is sensitive only to frequency differences, thereby making the output independent of relative phase angle between the frequencies being compared. The absolute phase angle may be controlled by conventional means, the present invention being adapted for control of rate of phase change.

It is an object of the present invention to accurately compare two frequencies, providing an output signal suitable for corrective control or for indication.

It is another object of the invention to provide a means for synchronizing a variable frequency generator with a reference frequency.

It is a further object to provide a means for holding two or more independently variable frequency generators in synchronism with each other while varying in absolute frequency, or maintaining a constant or a programmed difference frequency.

The invention, both as to its organization and method of operation, together with further objects and advantages thereof, will best be understood by reference to the following specification taken in conjunction with the accompanying drawing, which is a circuit diagram of the system with typical waveforms being indicated.

The operation of the overall system will be first described by reference to the component circuits in block form as indicated by dashed lines in the drawing, followed by a more detailed account of individual circuits.

Referring now to the drawing, there is shown a variable generator 11 which produces an output frequency which is to be controlled. A reference generator 12 has an output frequency to which the output of the variable generator 11 is to be compared. It should be understood that the reference generator 12 need not have a constant output frequency, but may be another variable frequency generator to which the variable generator 11 is to be compared. A variable generator waveform 13 indicates the output of the variable generator 11. Similarly, a reference waveform 14 indicates the output of the reference generator 12. The outputs of the variable generator 11 and the reference generator 12 are combined in a first adder 16, producing first adder output waveforms 17 and 17'. The first adder waveform 17, shown here, results when the generator waveform 13 and reference waveform 14 are at different frequencies so that the first adder waveform 17 consists of alternate cancellations and additions at a rate equal to the frequency difference. The first adder waveforms 17 and 17' are identical except for a 180° phase differential. In all instances in the present discussion where a prime number is used to label a waveform, it may be assumed to be identical to the corresponding waveform except for a 180° phase difference.

The first adder waveforms 17 and 17' are separately rectified in a first rectifier 18, producing rectified waveforms 19 and 19' waveshapes following the envelope of the voltage peaks in first adder waveforms 17 and 17'. The rectifier 18 includes filtering means for removing the higher frequency components from the rectifier output waveforms 19 and 19'. The rectified waveforms 19 and 19' are added together, resulting in a triangular waveform 20 which is differentiated in a differentiator 21 to produce square waveshape differentiator waveforms 22 and 22'. The differentiator waveform 22 has an essentially steady state negative value when the triangular waveform 20 has a negative or downward slope and has a positive value when the triangular waveform 20 has a positive or upward slope. The amplitude of the differentiator waveform 22 is proportional to the steepness or angle of the slope of the rectified waveform 20. The output of the differentiator 21 is then applied to a gated rectifier 23 which will be described in greater detail hereinafter.

The output of the variable generator 11 is shifted 90° in a phase shifter 24, which may be formed by the conventional resistance-capacitance phase shifters at the higher frequencies. When the invention is utilized to maintain synchronization of the shaft speed of rotating machines, the shaft position may be conveniently indicated by utilizing a spur tooth rotor affixed to the shaft for inducing a signal in a proximal stationary magnetic pickup which becomes the variable generator 11. A second stationary magnetic pickup may be used to conveniently obtain a second signal displaced 90° out of phase with the first signal. In the following discussion it should be understood that such a system might be utilized instead of the phase shifter 24.

The output from the phase shifter 24 is combined with the output of the reference source 12 in a second adder 26, identical in operation to the first adder 16. However, since the output of the variable generator 11 has been shifted 90°, assumed here to be a lagging phase shift, the envelope of the second adder output waveform 27 will be shifted 90° with respect to the envelope of the first adder waveform 17. The second adder waveforms 27 and 27' are shown here 90° leading the first adder waveforms 17 and 17', respectively. Reference to a particular lagging or leading phase shift is, of course, only for purposes of example and it is intended that nothing inherent in the invention should be implied thereby.

A second rectifier 28, identical to the first rectifier 18, is coupled to the second adder 26 and produces second rectifier output curves 29 and 29'. The outputs of the second rectifier 28 are coupled to a summarizer circuit 31 wherein the second rectifier curves 29 and 29' are combined to produce triangular waveshape summarizer signals 32 and 32'. The outputs of the summarizer circuit 31 are coupled to the gated rectifier 23 which also receives the outputs of the differentiator 21. The gated rectifier 23 produces a direct current gated rectifier output signal 33, available at an output terminal 34. The gated rectifier 23 in this example produces a positive voltage output when the two input signals (differentiator curve 22 and summarizer curve 32) are in phase, but will produce a negative output signal when the two input signals are of opposite phase. The amplitude of the output signal will be dependent on the amplitude of the differentiator curve 22, which in turn has an amplitude proportional to the frequency differential between the variable generator 11 and reference 12.

The output signal 33 at the output terminal 34 may be coupled to the variable generator 11 as a frequency adjusting feedback signal, indicated by a dashed line 36. However, the output signal may be utilized in other ways or combination of ways as previously discussed.

There is shown in detail the circuitry of the differentiator 21 and gated rectifier 23 for a particular embodiment of the invention. The rectifier waveform 19 is applied to the input differentiator 21, the signal passing through a high resistance differentiator resistor 49 in series with one end of a low impedance center-tapped primary winding 51 of a transformer 52. Similarly, the rectifier waveform 19' is passed through a second differentiator resistor 53 to the opposite end of the primary winding 51. The differentiator resistors 49 and 53 form the principal portion of an essentially constant impedance in the differentiator input circuit, thus the current through the primary winding 51 produces a magnetic field proportional to the current differential of the rectifier waveforms 19 and 19'. Rectifier waveforms 19 and 19' are combined in the transformer 52 so that the primary 51 current essentially follows the triangular waveform 20. A center-tapped secondary winding 54 in the transformer 52 has equal but opposite polarity differentiator output curves 22 and 22'. In this instance the curves 22 and 22' are indicated with respect to the secondary center-tap potential rather than to a steady state ground potential.

In the gated rectifier 23 there are eight rectifier tubes connected in pairs, whereby the cathodes of a first, third, fifth, and seventh rectifiers 56, 57, 58, and 59 are connected to the anodes of a second, fourth, sixth, and eighth rectifier 61, 62, 63, and 64, respectively. A first connecting wire 66 couples the differentiator output curve 22 from the differentiator 21 to the cathode of the first rectifier 56. Similarly, a second connecting wire 67 couples the differentiator output curve 22' to the cathode of the fifth rectifier 58. A center-tap lead 68 of the transformer 52 is connected to the output terminal 34 and through a capacitor 69 to ground. The cathodes of third and seventh rectifiers 57 and 59 are connected to ground. A first rectifier lead 71 couples summarizer curve 32 through a decoupling resistor 72 to the anodes of the fifth and seventh rectifiers 58 and 59, and similarly through a decoupling resistor 73 to the cathodes of the second and fourth rectifiers 61 and 62. A second rectifier lead 74 couples the summarizer curve 32' through a decoupling resistor 76 to the cathodes of the sixth and eighth rectifiers 63 and 64, and similarly through a decoupling resistor 77 to the anodes of the first and third rectifiers 56 and 57.

Considering now the operation of the gated rectifier circuit, it will be seen that during the first half cycle represented by the summarizer curves 32 and 32', the first, second, third, and fourth rectifiers 56, 57, 61, and 63 will be conductive while the remaining four rectifiers 58, 59, 63, and 64 are non-conductive. Therefore, in effect the second connecting wire 67 from the differentiator 21 is connected to an open circuit. However, the first connecting wire 66 is effectively connected to ground through the low impedance of the conducting second and fourth rectifiers 61 and 62. Since at this moment the potential at the center-tap lead 68 will be positive (the inverse of differentiator curve 22), the charge across the capacitor 69 and the output signal 33 at the output terminal 34 will be positive during the first half cycle of operation. The amplitude of the output signal 33 is dependent on the amplitude of the differentiator curve 22.

Considering the second half cycle of operation from 180° to 360°, the summarizer output waveforms 32 and 32' will cause the fifth, sixth, seventh, and eighth rectifiers 58, 63, 59, and 64 to be conducting while the remaining rectifiers 56, 61, 57, and 62 are non-conducting. Therefore, the first connecting wire 66 leads to an open circuit while the second connecting wire 67 is connected to ground through the low impedance of conducting fifth and seventh diodes 58 and 59. Thus the potential at the center-tap lead 68 will again be positive (the inverse of the last 180° of differentiator curve 22') and the steady state positive output signal 33 is obtained.

If, in the previous example, the variable generator waveform 13 is assumed to have a frequency higher than the reference generator waveform 14, then in the alternate case where the frequency of the variable generator waveform 13 is lower than the reference generator waveform 14, the summarizer waveforms 32 and 32' will be shifted 180° with respect to the differentiator curves 22 and 22'. By reapplying the events in the previous example, it will be apparent that the output signal 33 will then be negative.

Consider now the circuitry of the first adder 16 and the first rectifier 18. The variable generator 11 is coupled to the primary winding 81 of a variable generator transformer 82 having two secondary windings 83 and 84 with equal number of turns and identical electrical characteristics. Similarly, the reference generator 12 is coupled to the primary winding 86 of an identical reference transformer 87 having two secondary windings 88 and 89. Secondary winding 83 of the variable generator transformer 82 and secondary winding 88 of the reference transformer 87 are series connected. The remaining secondary windings 84 and 89 of the two transformers are similarly connected in series, but in the opposite sense or phase relationship. This means that at a particular moment, two input signals to the variable generator and reference generator transformers 82 and 87 are being added in phase in secondary windings 83 and 88, but are being added in the inverse phase in secondary windings 84 and 89. Therefore, the envelope of the adder output waveform 17 from the secondary windings 83 and 88 is 180° out of phase with the envelope of the adder output waveform 17' from the secondary windings 84 and 89.

In the rectifier 18, the first adder waveform 17 is rectified by a first diode 91 and high frequency components are removed by a first filter capacitor 92, producing rectifier waveform 19, which is the envelope of the first added waveform 17. Similarly, the first adder waveform 17' is rectified by a second diode 93 and high frequency components removed by a second filter capacitor 94, producing rectifier output waveform 19'. Thus, the rectifier waveforms 19 and 19' are related by a 180° phase differential.

The summarizer circuit 31 contains a summarizer transformer 96 having a high impedance center-tapped primary winding 97 wherein the second rectifier waveforms 29 and 29' are combined to produce a pair of triangular summarizer output waveforms 32 and 32' across a center-tapped secondary winding 98. A load resistor 99 is connected across the secondary winding 98. The effect of the loaded secondary winding 98 and the high impedance primary winding is to maintain an approximately constant load to the gated rectifier 23 when the current path changes from one bank of rectifier tubes to the other.

Considering now the method by which the invention detects whether the variable generator 11 is operating at a frequency higher or lower than the reference generator 12, an explanation will be presented by using examples. First, assume two equal amplitude signals having frequencies $f1$ and $f2$, comparable to variable generator signal 13 and reference signal 14, where $f1$ is higher than $f2$. At a time T, $f1$ will be inphase with $f2$, producing a resultant signal having maximum amplitude equal to the sum of the two signals. At a time $T+180°$ the signals $f1$ and $f2$ cancel to give zero output. At a still later time $T+360°$ and signals $f1$ and $f2$ again are in phase, adding together as at time T. The resultant would be comparable to the first adder waveform 17. In the second adder, assume $f1$ has been shifted ahead 90° in the phase shifter 24, therefore, the inphase time when $f1+90°$ and $f2$ combine to form a maximum amplitude resultant signal must have occurred 90° before the time T. Thus at time T the resultant signal is decreasing toward zero. By time $T+180°$ the zero output condition will have been reached and the output signal will be increasing toward a maximum, thereby forming a signal with the characteristic of second adder waveform 27.

Assume now a second example where $f1$ is a lower frequency than $f2$. As before, at time T the signals $f1$ and $f2$ will add inphase, while later at time $T+180°$ signals $f1$ and $f2$ will cancel. At time $T+360°$ the signals will again add, thus the first adder waveform 17 is produced exactly as in the first example. However, in the phase shifter 24, it is $f1$, the lower of the two frequencies that has been shifted ahead 90°. Shifting the lower frequency $f1$ ahead 90° is equivalent to shifting the higher frequency $f2$ back 90°. Thus in the first example the higher frequency $f1$ was shifted ahead of the lower frequency $f2$ and in the second example the higher frequency $f2$ was effectively shifted back of the lower frequency $f1$. Since the higher frequency $f2$ is in effect delayed with respect to $f1$, at time T, $f2$ ($-90°$) will be approaching the condition of being in phase with $f1$, producing a second adder output waveform inversely related to the second adder output waveform 27 of the first example. It follows then, that the summarizer output waveform will be inversely related to the waveform produced in the first example. Therefore, by review of the operation of the gated rectifier 23, it will be seen that the polarity of the potential at the output terminal 34 will reverse from the first example to the second example.

The embodiment of the invention described here was intended for usage at comparatively low frequencies. It will be apparent to those skilled in the art that usage of the invention at other frequencies and conditions will engender numerous variations and modifications within the spirit and scope of the invention and thus it is not intended to limit the invention except as defined in the following claims.

What is claimed is:

1. In a circuit sensitive to a co-existing signal frequency and a reference frequency, the combination comprising first means mixing said frequencies to produce a first difference frequency occurring at a frequency equal to the difference between said signal frequency and said reference frequency, means shaping said difference frequency to have an essentially triangular waveshape, a differentiator receiving said triangular waveshape difference frequency, first means shifting the phase of said signal frequency, second means mixing said reference frequency and said phase shifted signal frequency to produce a phase-shifted difference frequency having a period equal to said first difference frequency, means controlled by said phase-shifted difference frequency rectifying the output of said differentiator whereby an output potential is produced having an amplitude proportional to said difference frequency and having a polarity dependent upon the relative phase relationship between said first difference frequency and said second difference frequency.

2. In a circuit for detecting the frequency difference between two input signals, the combination comprising a first mixer circuit combining the said two input signals and having means for providing a generally triangularly shaped output signal with a frequency equal to the difference between said two input signals, a differentiator having an input coupled to the output of said mixer circuit and providing a generally square-wave signal representing the differential of the slope of said triangularly shaped signal, phase shifting means coupled to one of said input signals, a second mixer combining the other of said input signals with said phase-shifted input signal and providing a second mixer signal having a frequency equal to the frequency difference therebetween, a phase-sensitive circuit receiving said second mixer signal and said square-wave signal and producing an output signal having polarity dependent on the phase relationship therebetween and having an amplitude dependent on the amplitude of said square wave.

3. In a circuit for detecting the difference between a variable frequency and a reference frequency, the combination comprising a variable generator transformer having a first and a second secondary winding and having a primary winding receiving said variable frequency, a reference transformer having a third and a fourth secondary winding and having a primary winding receiving said reference frequency, said first secondary winding being series connected in an aiding phase to said third secondary winding, said second secondary winding being series connected in an opposing phase to said fourth secondary winding, a first rectifier coupled to said first secondary winding and said third secondary winding, a second rectifier coupled to the output of said second secondary winding and said fourth secondary winding, mixing means combining the outputs of said first rectifier and said second rectifier and being of the type which produces a triangularly shaped output signal, a differentiator coupled to the output of said mixing means which differentiator is of the class producing a square waveshape output signal, a phase shifter receiving said variable frequency, an adder circuit combining the output of said phase shifter with said reference frequency, a third rectifier receiving the output of said adder circuit, a gated rectifier receiving the outputs of said third rectifier and said differentiator.

4. In a circuit for detecting the frequency difference between a first and second alternating current input signal, the combination comprising a first adder circuit receiving said first and second input signal and producing a first and second beat frequency signal having beat frequency components mutually related by a 180° phase difference, a first rectifier receiving said first beat frequency signal, a second rectifier receiving said second beat frequency signal, a mixing means combining the outputs of said first and second rectifiers to produce a triangularly shaped waveform signal, a differentiator receiving said triangularly shaped waveform signal and producing a square wave output signal, a phase shifter receiving one of said input signals, a second adder circuit receiving the other of said input signals and the output of said phase shifter, and a balanced rectifier utilizing the output of said second adder as a switching signal for rectifying the output of said differentiator.

5. In a circuit for instantaneously detecting the difference between a variable frequency and a reference frequency, the combination comprising an adder circuit combining said variable frequency and said reference frequency to provide a first amplitude varying signal modulated at the beat frequency between said variable frequency and said reference frequency, said adder circuit further inversely combining said variable frequency and said reference frequency to provide a second amplitude varying signal modulated at said beat frequency, the modulation of said second amplitude varying signal being related by 180° phase difference with said first amplitude varying signal, a first rectifier receiving said first amplitude varying signal, a second rectifier receiving said second amplitude varying signal, a mixing circuit combining the outputs of said first and second rectifier circuits to produce an output signal having a triangularly shaped waveform, a differentiator receiving the output of said mixing circuit and producing a square wave output signal, and gated rectifier means coupled to the output of said differentiator.

References Cited in the file of this patent

UNITED STATES PATENTS

| | | |
|---|---|---|
| 2,104,801 | Hansell | Jan. 11, 1938 |
| 2,304,134 | Wirkler | Dec. 8, 1942 |
| 2,452,960 | Smith | Nov. 2, 1948 |
| 2,474,253 | Jacobsen | June 28, 1949 |
| 2,561,182 | Crane | July 17, 1951 |
| 2,562,912 | Hawley | Aug. 7, 1951 |
| 2,592,263 | Ingalls | May 6, 1952 |
| 2,696,582 | Willard | Dec. 7, 1954 |
| 2,774,932 | Patton | Dec. 18, 1956 |
| 2,829,251 | Patton | Apr. 1, 1958 |